(12) United States Patent
Espey

(10) Patent No.: US 7,913,617 B1
(45) Date of Patent: Mar. 29, 2011

(54) PLASTIC BOTTLE CRUSHING SYSTEM AND METHOD

(76) Inventor: John R. Espey, Dunedin, FL (US)

( * ) Notice: Subject to any disclaimer, the term of this patent is extended or adjusted under 35 U.S.C. 154(b) by 0 days.

(21) Appl. No.: 12/584,234

(22) Filed: Sep. 2, 2009

(51) Int. Cl.
*B30B 15/34* (2006.01)
*B30B 1/02* (2006.01)

(52) U.S. Cl. .......... 100/48; 100/341; 100/316; 100/326; 100/226; 100/283; 100/289; 100/902

(58) Field of Classification Search ............ 100/48, 100/341, 315, 316, 323, 325, 326, 226, 229 A, 100/240, 245, 283, 289, 902
See application file for complete search history.

(56) References Cited

U.S. PATENT DOCUMENTS

| | | | | |
|---|---|---|---|---|
| 3,551,952 A | * | 1/1971 | Morse | 100/321 |
| 3,817,170 A | * | 6/1974 | Mayer | 100/229 A |
| 6,367,377 B1 | * | 4/2002 | Gawley et al. | 100/49 |
| 6,598,522 B2 | * | 7/2003 | Yamaguchi | 100/42 |
| 6,655,268 B2 | * | 12/2003 | Comley et al. | 100/319 |
| 2009/0255421 A1 | * | 10/2009 | Koren et al. | 100/42 |

FOREIGN PATENT DOCUMENTS

FR 2692190 A1 * 12/1993
FR 2712230 A1 * 5/1995

* cited by examiner

*Primary Examiner* — Jimmy T Nguyen

(57) ABSTRACT

A container with a door forms an operating chamber. A crushing zone within the chamber is defined below by a support and above by a vertically reciprocable ram. A driving assembly raises and lowers the ram to compact a plastic bottle in the crushing zone. A heating element softens the plastic bottle. A programmer is operatively coupled to a plurality of controls for receiving operating instructions and to the heating element and the driving assembly to thereby cause an appropriate cycle of operation for crushing and compacting the plastic bottle.

1 Claim, 2 Drawing Sheets

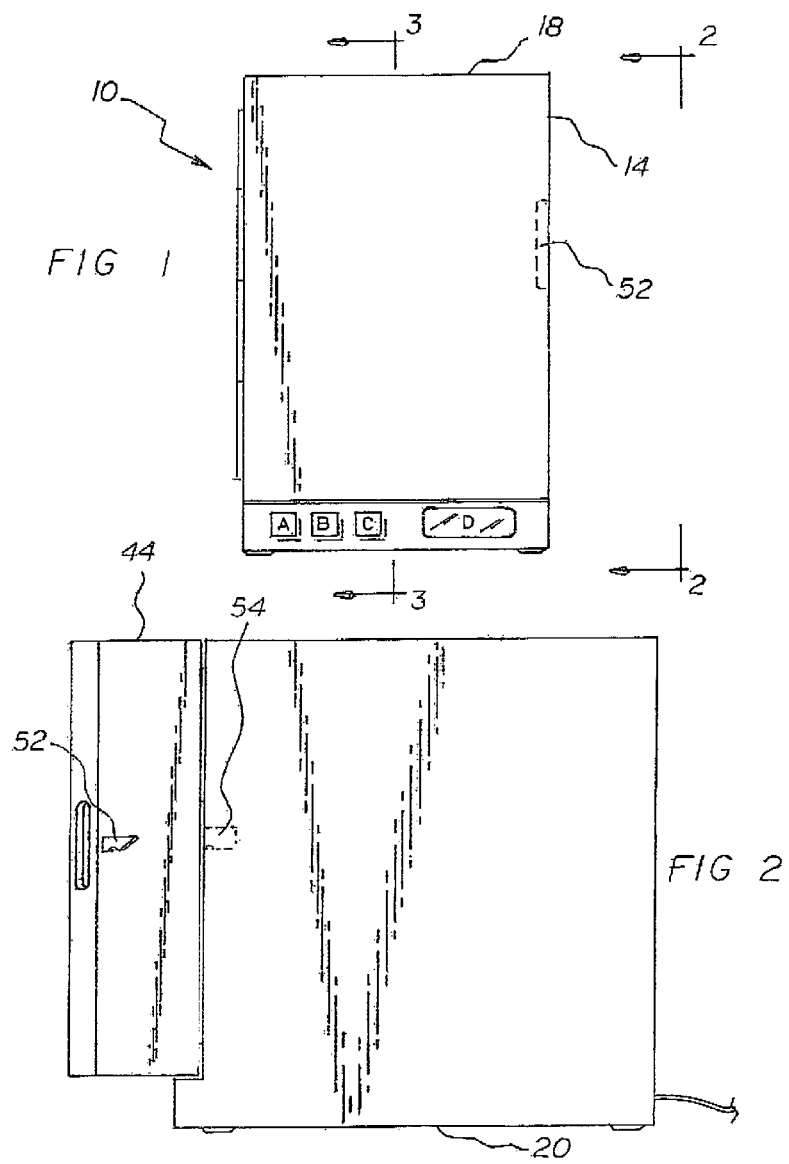

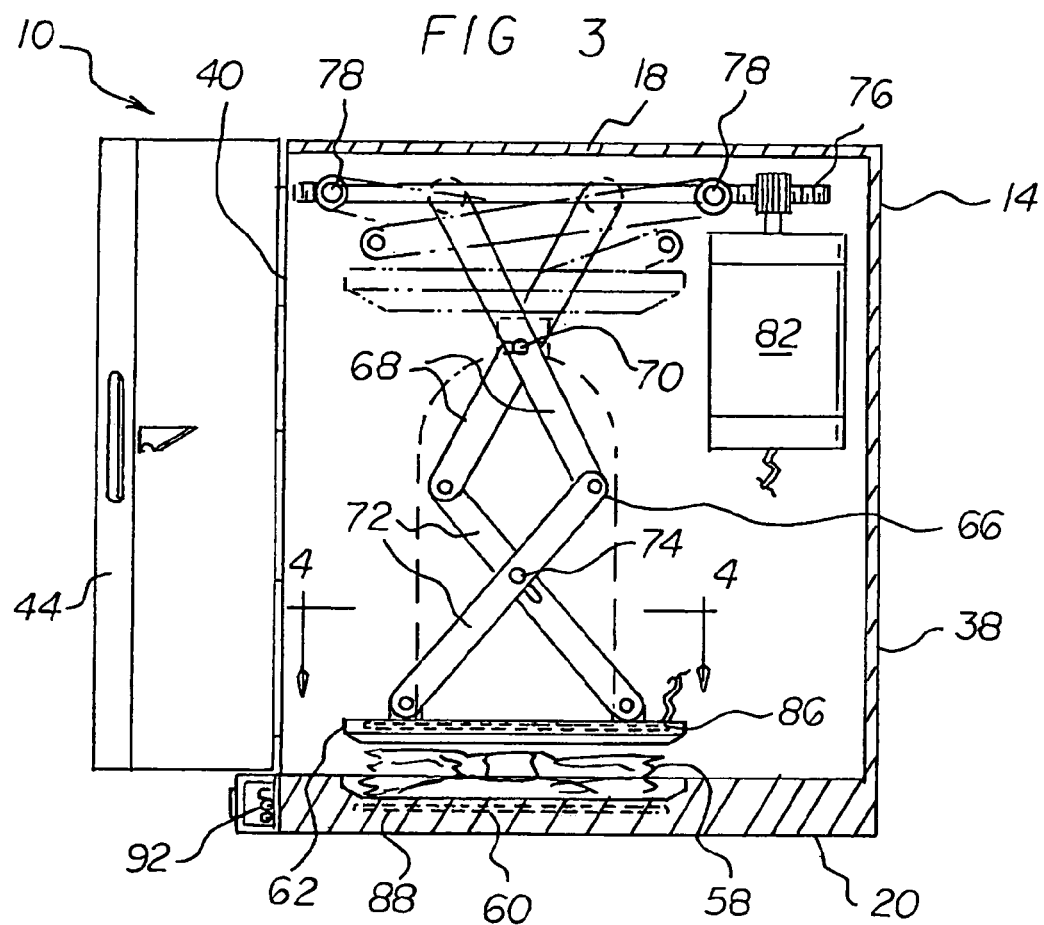
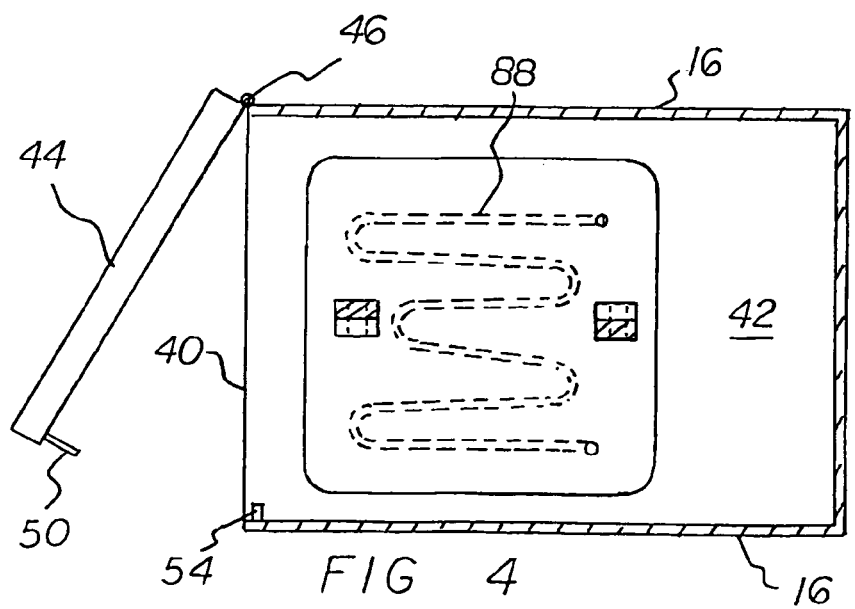

PLASTIC BOTTLE CRUSHING SYSTEM AND METHOD

BACKGROUND OF THE INVENTION

1. Field of the Invention

The present invention relates to a plastic bottle crushing system and method and more particularly pertains to reducing the volume of plastic bottles for storage, transportation and reuse in a safe, ecologically sound, economical and convenient manner.

2. Description of the Prior Art

The use of bottle crushing systems of known designs and configurations is known in the prior art. More specifically, bottle crushing systems of known designs and configurations previously devised and utilized for the purpose of reducing the volume of bottles are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a plastic bottle crushing system and method that allows reducing the volume of plastic bottles for storage, transportation and reuse in a safe, ecologically sound, economical and convenient manner.

In this respect, the plastic bottle crushing system and method according to the present invention substantially departs from the conventional concepts and designs of the prior art, and in doing so provides an apparatus primarily developed for the purpose of reducing the volume of plastic bottles for storage, transportation and reuse in a safe, ecologically sound, economical and convenient manner.

Therefore, it can be appreciated that there exists a continuing need for a new and improved plastic bottle crushing system and method which can be used for reducing the volume of plastic bottles for storage, transportation and reuse in a safe, ecologically sound, economical and convenient manner. In this regard, the present invention substantially fulfills this need.

SUMMARY OF THE INVENTION

In view of the foregoing disadvantages inherent in the known types of bottle crushing systems of known designs and configurations now present in the prior art, the present invention provides an improved plastic bottle crushing system and method. As such, the general purpose of the present invention, which will be described subsequently in greater detail, is to provide a new and improved plastic bottle crushing system and method which has all the advantages of the prior art and none of the disadvantages.

To attain this, the present invention essentially comprises a container having parallel side panels. The container has a roof above and a parallel floor below. The container has a back panel and a parallel open front. The container forms an operating chamber. The chamber has a width of 12 inches, plus or minus 20 percent, separated by the side panels. The chamber has a height of 18 inches, plus or minus 20 percent, separated by the floor and roof. The chamber has a depth of 18 inches, plus or minus 20 percent, separated by the back panel and the front. The container includes a rectangular door with a side edge and a hinge pivotably coupling the side edge of the door to one of the side panels. The door is adapted to pivot between a closed orientation sealing the open front of the chamber and an open orientation allowing for the passage of plastic bottles through the open front into and from the chamber.

Next provided is a door locking assembly. The door locking assembly includes a latch movable with the door and a pin on one of the panels co-operable with the latch.

A crushing zone within the chamber is defined below by a fixed recess in the floor and above by a vertically reciprocable ram.

Next provided is a driving assembly. The driving assembly includes a pair of upper arms with upper and lower ends and an upper pivot pin coupling the upper arms at a central extent. The driving assembly includes a pair of lower arms with upper and lower ends and a lower pivot pin coupling the lower arms at a central extent. The lower ends of the lower arms are pivotably coupled to the ram. A threaded bolt is rotatably mounted in the chamber adjacent to the roof. Threaded nuts are coupled to the upper ends of the upper arms and receive the bolt. The nuts have left and right threads. The bolt has opposed ends with left and right threads. In this manner, rotation of the bolt in a first direction is adapted to separate the arms to raise the ram. Rotation of the bolt in a second direction is adapted to contract the arms to lower the ram and compact one of the plastic bottles located in the crushing zone.

A reversible motor is next provided. The reversible motor is operatively coupled to the bolt for rotating the bolt and raising and lowering the ram. The ram takes between 1 to 4 minutes to lower.

Next provided is an upper heating element in the ram and a lower heating element in the floor beneath the recess. The heating elements are adapted to soften the plastic bottle being compacted. The heating elements raise the temperature in the chamber to between 100 degrees and 250 degrees.

A plurality of buttons are next provided beneath the open front and the door. The buttons include A, B, C and D buttons. The A button is for activating the door locking assembly and then the heating elements and then the reversible motor. The B button is for activating the door locking assembly and then the reversible motor. The C button is for an emergency stop to inactivate the heating elements and then the reversible motor and then the door locking assembly. The D button is for opening the door following the termination of the heating assembly, the raising of the ram and then the releasing of the door locking assembly.

Lastly, a controller is provided. The controller is controlled by the buttons and is adapted to operate the door locking assembly, heating elements and reversible motor for crushing and compacting the plastic bottle located in the crushing zone.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved plastic bottle crushing system and method which has all of the advantages of the prior art bottle crushing systems of known designs and configurations and none of the disadvantages.

It is another object of the present invention to provide a new and improved plastic bottle crushing system and method which may be easily and efficiently manufactured and marketed.

It is further object of the present invention to provide a new and improved plastic bottle crushing system and method which is of durable and reliable constructions.

An even further object of the present invention is to provide a new and improved plastic bottle crushing system and method which is susceptible of a low cost of manufacture with regard to both materials and labor, and which accordingly is then susceptible of low prices of sale to the consuming public, thereby making such plastic bottle crushing system and method economically available to the buying public.

Even still another object of the present invention is to provide a plastic bottle crushing system and method for reducing the volume of plastic bottles for storage, transportation and reuse in a safe, ecologically sound, economical and convenient manner.

Lastly, it is an object of the present invention to provide a new and improved plastic bottle crushing system and method having a container with a door forming an operating chamber. A crushing zone within the chamber is defined below by a support and above by a vertically reciprocable ram. A driving assembly raises and lowers the ram to compact a plastic bottle in the crushing zone. A heating element softens the plastic bottle. A programmer is operatively coupled to a plurality of controls for receiving operating instructions and to the heating element and the driving assembly to thereby cause an appropriate cycle of operation for crushing and compacting the plastic bottle.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of a plastic bottle crushing system constructed in accordance with the principles of the present invention.

FIG. 2 is a side elevational view taken at line 2-2 of FIG. 1 but with the door open.

FIG. 3 is a cross sectional view taken along line 3-3 of FIG. 1.

FIG. 4 is a cross sectional view taken along line 4-4 of FIG. 3.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved plastic bottle crushing system and method embodying the principles and concepts of the present invention and generally designated by the reference numeral 10 will be described.

The present invention, the plastic bottle crushing system and method 10 is comprised of a plurality of components. Such components in their broadest context include a container, a crushing zone, a driving assembly, a heating element and a plurality of controls. Such components are individually configured and correlated with respect to each other so as to attain the desired objective.

The plastic bottle crushing system 10 of the present invention is for reducing the volume of plastic bottles for storage, transportation and reuse. The reducing of volume is done in a safe, ecologically sound, economical and convenient manner. First provided is a container 14 having parallel side panels 16. The container has a roof 18 above and a parallel floor 20 below. The container has a back panel 38 and a parallel open front 40. The container forms an operating chamber 42. The chamber has a width of 12 inches, plus or minus 20 percent, separated by the side panels. The chamber has a height of 18 inches, plus or minus 20 percent, separated by the floor and roof. The chamber has a depth of 18 inches, plus or minus 20 percent, separated by the back panel and the front. The container includes a rectangular door 44 with a side edge and a hinge 46 pivotably coupling the side edge of the door to one of the side panels. The door is adapted to pivot between a closed orientation sealing the open front of the chamber and an open orientation allowing for the passage of plastic bottles through the open front into and from the chamber.

Next provided is a door locking assembly 50. The door locking assembly includes a latch 52 movable with the door and a pin 54 on one of the panels co-operable with the latch.

A crushing zone 58 within the chamber is defined below by a fixed recess 60 in the floor and above by a vertically reciprocable ram 62.

Next provided is a driving assembly 66. The driving assembly includes a pair of upper arms 68 with upper and lower ends and an upper pivot pin 70 coupling the upper arms at a central extent. The driving assembly includes a pair of lower arms 72 with upper and lower ends and a lower pivot pin 74 coupling the lower arms at a central extent. The upper ends of the lower arms are pivotally coupled to the lower ends of the upper arms in a scissors-like manner. The lower ends of the lower arms are pivotally coupled to the ram. A threaded bolt 76 is rotatably mounted in the chamber adjacent to the roof. Threaded nuts 78 are coupled to the upper ends of the upper arms and receive the bolt. The nuts have left and right threads. The bolt has opposed ends with left and right threads. In this manner, rotation of the bolt in a first direction is adapted to separate the arms to raise the ram. Rotation of the bolt in a second direction is adapted to contract the arms to lower the ram and compact one of the plastic bottles located in the crushing zone.

A reversible motor 82 is next provided. The reversible motor is operatively coupled to the bolt for rotating the bolt and raising and lowering the ram. The ram takes between 1 to 4 minutes to lower.

Next provided is an upper heating element 86 in the ram and a lower heating element 88 in the floor beneath the recess. The heating elements are adapted to soften the plastic bottle being compacted. The heating elements raise the temperature in the chamber to between 100 degrees and 250 degrees.

A plurality of buttons are next provided beneath the open front and the door. The buttons include A, B, C and D buttons. The A button is for activating the door locking assembly and then the heating elements and then the reversible motor. The B button is for activating the door locking assembly and then the reversible motor. The C button is for an emergency stop to inactivate the heating elements and then the reversible motor and then the door locking assembly. The D button is for opening the door following the termination of the heating assembly, the raising of the ram and then the releasing of the door locking assembly.

Lastly, a controller 92 is provided. The controller is controlled by the buttons and is adapted to operate the door locking assembly, heating elements and reversible motor for crushing and compacting the plastic bottle located in the crushing zone.

The present invention includes a method of plastic bottle crushing. The first step of the method is providing a container with a door forming an operating chamber. The next step is providing a crushing zone within the chamber defined by a support below and a vertically reciprocable ram above. The next step is providing a driving assembly to raise and lower the ram to compact a plastic bottle in the crushing zone. The next step is providing a heating element to soften the plastic bottle being compacted. The next step is providing a plurality of controls with a programmer operatively coupled to the controls for receiving operating instructions. The programmer is operatively coupled to the heating element and the driving assembly functions in an appropriate cycle of operation for crushing and compacting the plastic bottle. The next step is positioning the plastic bottle in the crushing zone. The next step is activating the heating element to soften and contract the plastic bottle. The final step is lowering the ram to crush and compact the softened bottle.

For high density polyethylene bottles as used for milk, the temperature range is preferably between 100 degrees and 120 degrees Fahrenheit, from a softening temperature to a temperature slightly below melting. For polyethylene terephthalate bottles as used for soft drinks, the temperature range is preferably between 200 degrees and 250 degrees Fahrenheit, from a softening temperature to a temperature slightly below melting. Further, to minimize damage from melting plastic, the surfaces of the system adapted to touch a bottle, such as the ram and the recess, are preferably coated with an adhesive material such as teflon.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A plastic bottle crushing system for reducing the volume of plastic bottles for storage, transportation and reuse, the system comprising, in combination:

a container having parallel side panels, the container having a roof above and a parallel floor below, the container having a back panel and a parallel open front, the container forming an operating chamber, the chamber having a width of 12 inches, plus or minus 20 percent, separated by the side panels, the chamber having a height of 18 inches, plus or minus 20 percent, separated by the floor and the roof, the chamber having a depth of 18 inches, plus or minus 20 percent, separated by the back panel and the front, the container including a rectangular door with a side edge and a hinge pivotably coupling the side edge of the door to one of the side panels, the door adapted to pivot between a closed orientation sealing the open front of the chamber and an open orientation allowing for the passage of plastic bottles through the open front into and from the chamber; a door locking assembly including a latch movable with the door and a pin on one of the panels co-operable with the latch;

a crushing zone within the chamber defined below by a fixed recess in the floor and above by a vertically reciprocable ram;

a driving assembly including a pair of upper arms with upper and lower ends and an upper pivot pin coupling the upper arms at a central extent, the driving assembly including a pair of lower arms with upper and lower ends and a lower pivot pin coupling the lower arms at a central extent, the lower ends of the lower arms pivotably coupled to the ram, a threaded bolt rotatably mounted in the chamber adjacent to the roof, threaded nuts coupled to the upper ends of the upper arms and receiving the bolt, the nuts having left and right threads, the bolt having opposed ends with left and right threads, rotation of the bolt in a first direction adapted to separate the arms to raise the ram, rotation of the bolt in a second direction adapted to contract the arms to lower the ram and compact one of the plastic bottles located in the crushing zone;

a reversible motor operatively coupled to the bolt for rotating the bolt and raising and lowering the ram, wherein the ram takes between 1 to 4 minutes to lower;

an upper heating element in the ram and a lower heating element in the floor beneath the recess, the heating elements adapted to soften the plastic bottle being compacted, the heating elements raising the temperature in the chamber to between 100 degrees and 250 degrees;

a plurality of buttons on the housing beneath the open front and the door, the buttons including an A button for activating the door locking assembly and then the heating elements and then the reversible motor, the buttons including a B button for activating the door locking assembly and then the reversible motor, the buttons including a C button for an emergency stop to inactivate the heating elements and then the reversible motor and then the door locking assembly, the buttons including a D button for opening the door following the termination of the heating assembly, the raising of the ram and then the releasing of the door locking assembly; and a controller controlled by the buttons and adapted to operate the door locking assembly, heating elements and reversible motor for crushing and compacting the plastic bottle located in the crushing zone.

\* \* \* \* \*